(12) United States Patent
Lemarenko et al.

(10) Patent No.: US 11,378,707 B2
(45) Date of Patent: Jul. 5, 2022

(54) THIRD INTERFACE ECHO (TIE) DETECTION FROM FLEXURAL DATA FOR GAS/LIQUID ANNULUS DISCRIMINATION

(71) Applicant: Schlumberger Technology Corporation, Sugar Land, TX (US)

(72) Inventors: Mikhail Lemarenko, Beijing (CN); Elizaveta Rybka, Palaiseau (FR); Ram Sunder Kalyanraman, Richmond, TX (US); Josselin Kherroubi, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/096,016

(22) Filed: Nov. 12, 2020

(65) Prior Publication Data

US 2022/0146701 A1 May 12, 2022

(51) Int. Cl.
*G01V 1/46* (2006.01)
*E21B 47/005* (2012.01)
*G01V 1/50* (2006.01)
*E21B 47/14* (2006.01)

(52) U.S. Cl.
CPC .............. *G01V 1/46* (2013.01); *E21B 47/005* (2020.05); *E21B 47/14* (2013.01); *G01V 1/50* (2013.01); *G01V 2210/324* (2013.01)

(58) Field of Classification Search
CPC ...... G01V 1/46; G01V 1/50; G01V 2210/324; E21B 47/14; E21B 47/005
See application file for complete search history.

(56) References Cited

U.S. PATENT DOCUMENTS

| | | | |
|---|---|---|---|
| 9,529,105 B2 * | 12/2016 | Collins | G01V 1/345 |
| 10,378,341 B2 | 8/2019 | van Kuijk et al. | |
| 10,898,824 B1 * | 1/2021 | Meno | F41B 7/00 |
| 11,098,583 B1 * | 8/2021 | Sirevaag | E21B 47/005 |
| 2017/0212274 A1 * | 7/2017 | Sun | G01V 1/48 |

OTHER PUBLICATIONS

Morris et al, "Enhanced Ultrasonic Measurements for Cement and Casing Evaluation," 2007, AADE Publication, AADE-07, pp. 1-13 (Year: 2007).*

* cited by examiner

*Primary Examiner* — Elias Desta
(74) *Attorney, Agent, or Firm* — Rodney Warfford

(57) ABSTRACT

Systems and methods for identifying a potential third interface echo (TIE) using objective criteria are provided. A system includes an acoustic logging tool that obtains measurements in a wellbore and a data processing system that has a processor that receives the measurements from the acoustic logging tool. The data processing system may identify a third interface echo (TIE) using a neural network and/or by a signal analysis method based on the behavioral characteristics of the TIE signal.

23 Claims, 12 Drawing Sheets

THIRD INTERFACE ECHO (TIE) DETECTION FROM FLEXURAL DATA FOR GAS/LIQUID ANNULUS DISCRIMINATION

BACKGROUND

This disclosure relates generally to acoustic logging and, more specifically, to identifying matter in an annulus by identifying a third interface echo (TIE) using objective criteria.

A wellbore drilled into a geological formation may be targeted to produce oil and/or gas from certain zones of the geological formation. To prevent zones from interacting with one another via the wellbore and to prevent fluids from undesired zones entering the wellbore, the wellbore may be completed by placing a cylindrical casing into the wellbore and cementing the annulus between the casing and the wall of the wellbore. During cementing, cement may be injected into the annulus formed between the cylindrical casing and the geological formation. When the cement properly sets, fluids from one zone of the geological formation may not be able to pass through the wellbore to interact with one another. This desirable condition is referred to as "zonal isolation." Sometimes, well completions may not go as planned. For example, the cement may not set as planned and/or the quality of the cement may be less than expected. In other cases, the cement may unexpectedly fail to set above a certain depth due to natural fissures in the formation.

A variety of acoustic tools may be used to verify that cement is properly installed. These acoustic tools may use pulse acoustic waves and/or flexural waves as they are lowered through the wellbore to obtain acoustic cement evaluation data (e.g., flexural attenuation and/or acoustic impedance measurements). The acoustic cement evaluation data may be analyzed to identify whether solids, liquids, or gases are in the annulus behind the casing of the wellbore. When the acoustic cement evaluation data indicates that a solid is present, the cement is likely to have set properly. When the acoustic cement evaluation data indicates that a liquid or gas is present, the cement may be interpreted not to have properly set. In many situations, cement could take a complex combination of solids and fluids. In particular, it may be difficult to discriminate gas in the annulus (or large dry debonded cement) from liquid in the annulus.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first example, a system includes an acoustic logging tool that obtains flexural measurements in a wellbore crossing a geological formation and having a casing installed inside the wellbore and a data processing system. The data processing system may include a processor that receives the flexural measurements, produces a well log view image using the flexural measurements that includes flexural waveforms in a plurality of positions versus time, and processes the well log view image to identify a presence or absence of a third interface echo. In response to identifying the presence of the third interface echo, the processor may identify an annulus between the casing and the geological formation as having a first characteristic. In response to identifying the absence of the third interface echo, the processor may identify the annulus between the casing and the geological formation as having a second characteristic.

In a second example, a method includes receiving pulse echo measurements and flexural measurements obtained from one or more acoustic logging tools placed in a wellbore crossing a geological formation and having a casing installed inside at least some depths of the wellbore. The method also includes receiving calibration pulse echo measurements obtained from the one or more acoustic logging tools placed in a free pipe depth of the wellbore where the casing is not present. The pulse echo measurements may be processed according to the calibration pulse echo measurements to identify a characteristic of an annulus between the casing and the geological formation. The flexural measurements may be processed to identify a presence or absence of a third interface echo. The characteristic of the annulus identified using the pulse echo measurements may be validated based at least in part on the presence or absence of the third interface echo identified using the flexural measurements.

In a third example, an article of manufacture that includes one more tangible, non-transitory, machine-readable media may include instructions that, when executed by one or more processors, cause the one or more processors to perform a variety of operations. These may include receiving flexural measurements obtained by an acoustic logging tool in a wellbore crossing a geological formation and having a casing installed inside the wellbore, producing a well log view image using the flexural measurements that includes flexural waveforms in a plurality of positions versus time, and processing the well log view image to identify a presence or absence of a third interface echo. In response to identifying the presence of the third interface echo, the instructions may cause the pone or more processors to identify an annulus between the casing and the geological formation as having a first characteristic and, in response to identifying the absence of the third interface echo, identify the annulus between the casing and the geological formation as having a second characteristic.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
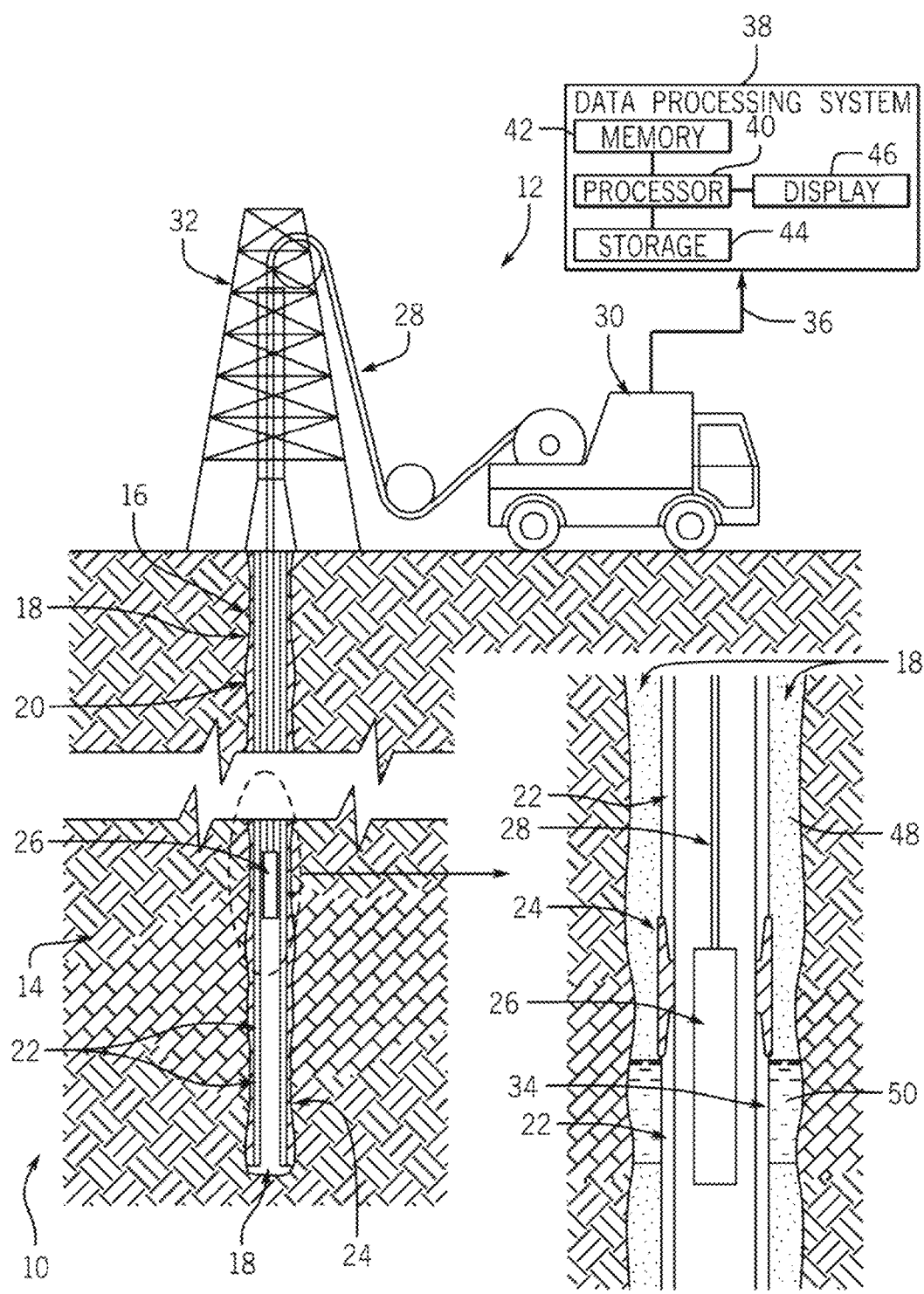
FIG. 1 is a depiction of a well logging operation, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

When a well is drilled, metal casing may be installed inside the well and cement placed into the annulus between the casing and the wellbore. When the cement sets, fluids from one zone of the geological formation may not be able to pass through the annulus of the wellbore to interact with another zone. This desirable condition is referred to as "zonal isolation." Proper cement installation may also ensure that the well produces from targeted zones of interest. To verify that the cement has been properly installed, this disclosure teaches systems and methods for evaluating acoustic cement evaluation data. As used herein, "acoustic cement evaluation data" refers to any suitable acoustic data, such as pulse-echo acoustic impedance data and/or flexural attenuation data that may be obtained from one or more acoustic downhole tools. Examples include sonic and ultrasonic pulse-echo and flexural modes.

The acoustic cement evaluation data that is obtained by acoustic downhole tools may be processed to discriminate between different materials that may be located in the annulus between the casing and the wellbore. It may be particularly difficult to discriminate between certain types of materials. For example, the acoustic impedance of gas (e.g., 0-0.3 MRayls) may be similar to that of liquid (e.g., 0.8+ MRayls). Within the precision of a pulse-echo interpretation of the acoustic cement evaluation data, these materials could quite often be confused, especially during a downhole tool calibration referred to as a free-pipe normalization. In some situations, during the free-pipe normalization procedure, the downhole tool could be wrongly set to detect the fluid in the annulus instead of gas. This could lead to a systematic positive bias of more than 1 MRayl, leading to a distortion of processing and to the misinterpretation of the well integrity situation. To avoid this, the acoustic cement evaluation data may include flexural acoustic waves. Flexural acoustic waves may generate additional formation reflection echoes under certain conditions (referred to as third interface echoes (TIEs)) when liquid is present in the annulus. In the case of a gas-filled annulus, flexural acoustic waves may not generate a third interface echo (TIE).

As such, identifying whether a TIE occurs due to flexural acoustic waves in the acoustic cement evaluation data may enable discrimination of liquid and gas (as well as other materials with similar properties, such as large dry debonded cement or debonded solids with dry micro-annulus). Yet TIE detection is not a trivial task, especially due to the presence of the signals of other nature that can easily be confused with the TIE. This disclosure thus provides systems and methods for automating the detection of TIE using objective criteria. In some cases, this may take place autonomously using machine learning based on historical datasets of the acoustic cement evaluation data and expert opinion regarding the correctness of the identified TIEs well log view images. Additionally or alternatively, signal processing may be performed to reach this goal, including in particular using the geometric properties of the TIE to identify it. Thereafter, the presence or absence of a TIE may be used to identify a likely state of the cement (e.g., solid, liquid, gas) in the annulus behind the casing.

With this in mind, FIG. 1 schematically illustrates a system 10 for evaluating cement behind casing in a well. In particular, FIG. 1 illustrates surface equipment 12 above a geological formation 14. In the example of FIG. 1, a drilling operation has previously been carried out to drill a wellbore 16. In addition, an annular fill 18 (e.g., cement) has been used to seal an annulus 20—the space between the wellbore 16 and casing joints 22 and collars 24—with cementing operations.

As seen in FIG. 1, several casing joints 22 (also referred to below as casing 22) are coupled together by the casing collars 24 to stabilize the wellbore 16. The casing joints 22 represent lengths of pipe, which may be formed from steel or similar materials. In one example, the casing joints 22 each may be approximately 13 m or 40 ft long, and may include an externally threaded (male thread form) connection at each end. A corresponding internally threaded (female thread form) connection in the casing collars 24 may connect two nearby casing joints 22. Coupled in this way, the casing joints 22 may be assembled to form a casing string to a suitable length and specification for the wellbore 16. The casing joints 22 and/or collars 24 may be made of carbon steel, stainless steel, or other suitable materials to withstand a variety of forces, such as collapse, burst, and tensile failure, as well as chemically aggressive fluid.

The surface equipment 12 may carry out various well logging operations to detect conditions of the wellbore 16. The well logging operations may measure parameters of the geological formation 14 (e.g., resistivity or porosity) and/or the wellbore 16 (e.g., temperature, pressure, fluid type, or fluid flowrate). Other measurements may provide acoustic cement evaluation data (e.g., flexural attenuation and/or acoustic impedance) that may be used to verify the cement installation and the zonal isolation of the wellbore 16. One or more acoustic logging tools 26 may obtain some of these measurements.

The example of FIG. 1 shows the acoustic logging tool 26 being conveyed through the wellbore 16 by a cable 28. Such a cable 28 may be a mechanical cable, an electrical cable, or an electro-optical cable that includes a fiber line protected against the harsh environment of the wellbore 16. In other examples, however, the acoustic logging tool 26 may be conveyed using any other suitable conveyance, such as coiled tubing. The acoustic logging tool 26 may be, for example, an UltraSonic Imager (USI) tool and/or an Isolation Scanner (IS) tool by Schlumberger Technology Corporation. The acoustic logging tool 26 may obtain measurements of acoustic impedance from ultrasonic waves and/or flexural attenuation. For instance, the acoustic logging tool 26 may obtain a pulse echo measurement that exploits the thickness mode (e.g., in the manner of an ultrasonic imaging tool) or may perform a pitch-catch measurement that exploits the flexural mode (e.g., in the manner of an imaging-behind-casing (IBC) tool).

The acoustic logging tool 26 may be deployed inside the wellbore 16 by the surface equipment 12, which may include a vehicle 30 and a deploying system such as a drilling rig 32. Data related to the geological formation 14 or the wellbore 16 gathered by the acoustic logging tool 26 may be transmitted to the surface, and/or stored in the acoustic logging tool 26 for later processing and analysis. As will be discussed further below, the vehicle 30 may be fitted with or may communicate with a computer and software to perform data collection and analysis.

FIG. 1 also schematically illustrates a magnified view of a portion of the cased wellbore 16. As mentioned above, the acoustic logging tool 26 may obtain acoustic cement evaluation data relating to the presence of solids, liquids, or gases behind the casing 22. For instance, the acoustic logging tool 26 may obtain measures of acoustic impedance and/or flexural attenuation, which may be used to determine where the material behind the casing 22 is a solid (e.g., properly set cement) or is not solid (e.g., is a liquid or a gas). When the acoustic logging tool 26 provides such measurements to the surface equipment 12 (e.g., through the cable 28), the surface equipment 12 may pass the measurements as acoustic cement evaluation data 36 to a data processing system 38 that includes a processor 40, memory 42, storage 44, and/or a display 46. In other examples, the acoustic cement evaluation data 36 may be processed by a similar data processing system 38 at any other suitable location. The data processing system 38 may collect the acoustic cement evaluation data 36 and process the data as will be explained below. To do this, the processor 40 may execute instructions stored in the memory 42 and/or storage 44. As such, the memory 42 and/or the storage 44 of the data processing system 38 may be any suitable article of manufacture that can store the instructions. The memory 42 and/or the storage 44 may be ROM memory, random-access memory (RAM), flash memory, an optical storage medium, or a hard disk drive, to name a few examples. The display 46 may be any suitable electronic display that can display the logs and/or other information relating to classifying the material in the annulus 20 behind the casing 22.

In this way, the acoustic cement evaluation data 36 from the acoustic logging tool 26 may be used to determine whether cement of the annular fill 18 has been installed as expected. In some cases, the acoustic cement evaluation data 36 may indicate that the cement of the annular fill 18 has a generally solid character (e.g., as indicated at numeral 48) and therefore has properly set. In other cases, the acoustic cement evaluation data 36 may indicate the potential absence of cement or that the annular fill 18 has a generally liquid or gas character (e.g., as indicated at numeral 50), which may imply that the cement of the annular fill 18 has not properly set. For example, when the acoustic cement evaluation data indicate that the annular fill 18 has the generally liquid character as indicated at numeral 50, this may imply that the cement is either absent or was of the wrong type or consistency, and/or that fluid channels have formed in the cement of the annular fill 18.

Figure 2:
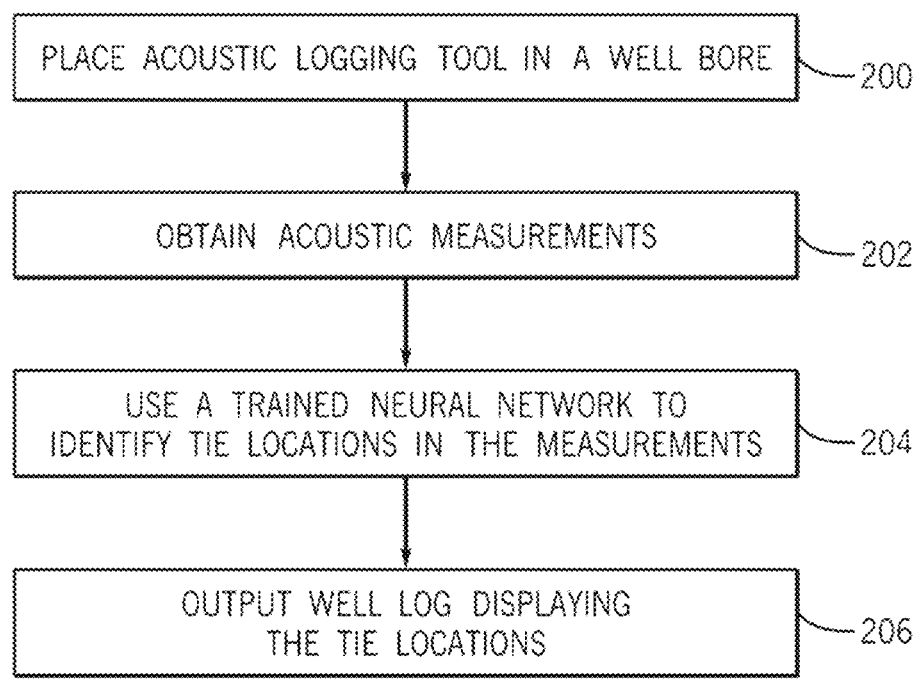
FIG. 2 is a flowchart of a method for generating a well log displaying TIE points, in accordance with an embodiment.

FIG. 2 shows a method for identifying a third interface echo (TIE) in acoustic cement well logging data from an acoustic logging tool using a neural network. It should be appreciated that the method of FIG. 2 is provided by way of example, and may be performed in a different order and with more or fewer stages than described here. At process block 200, the acoustic logging tool is placed in a wellbore. The wellbore may include an annulus, casing, cement, mud, fluid, and/or geological formation, as discussed above with reference to FIG. 1. As such, the acoustic logging tool may be placed in such a manner that the acoustic logging tool may have multiple interfaces (e.g., different layers of material) between the acoustic logging tool and the geological formation. The acoustic logging tool may be any type of tool that obtains acoustic measurements. For example, the acoustic logging tool may include a pulse echo tool and/or a flexural tool.

At process block 202, the acoustic logging tool obtains acoustic measurements. The acoustic measurements may be obtained through flexural measurements. Flexural measurements are obtained using flexural waves that may generate formation reflection echoes including third interface echoes (TIE) that appear at the third interface encountered by the flexural wave, i.e., generally the interface with the geological formation. The flexural waves may interact with the different interfaces, which may or may not produce a TIE depending on the material behind the casing. At process block 202, further measurements may also be obtained, in particular pulse-echo measurements. The acoustic impedance measurements, i.e., waveforms recorded by the tool in response to a pulse-echo and/or flexural signal, may be plotted on a graph over time or on an image showing the waveforms vs time and depth. The pulse-echo and flexural measurements are described in more details in the following.

At process block 204, a trained neural network is used to identify TIE locations in the waveforms obtained from the measurements. The trained neural network may use the images plotting the waveforms vs. time and depth as input. In another embodiment, the trained neural network uses the waveform versus time taken at each depth as an input. The trained neural network may analyze small portions of each image, corresponding to waveforms taken at a plurality of depths. When analyzing the image versus time and depth, the trained neural network may use textural pattern analysis to determine if a TIE is present in each portion of the image.

At process block 206, a well log displaying depths where TIE has been identified is output. The output may be another image corresponding to an input image that highlights the locations at which TIE is present, for instance using a bold line or placing boxes around the detected TIEs. The trained neural network may also shade the TIE directly on the input image.

Figure 3:
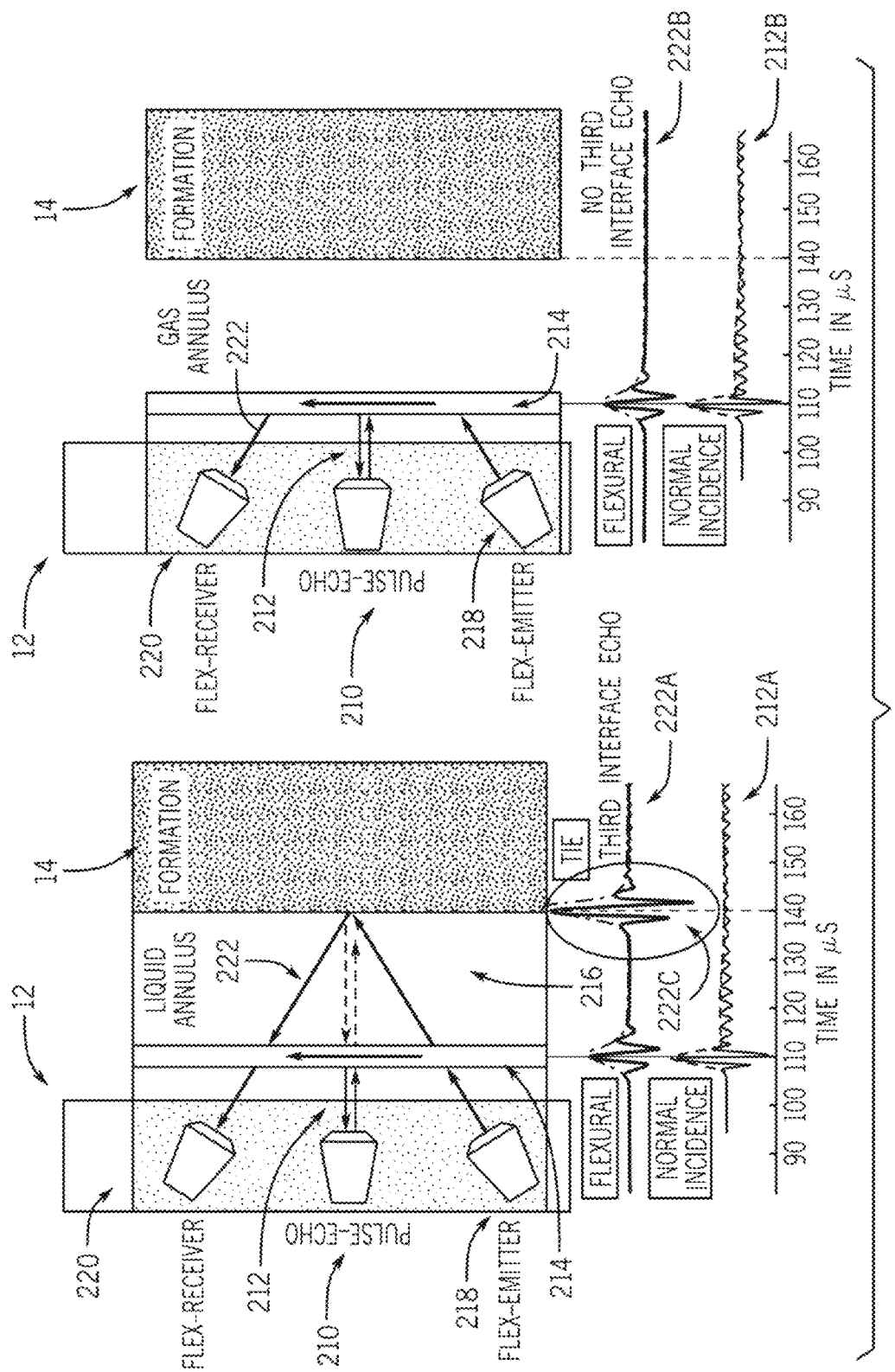
FIG. 3 is a diagram of an acoustic logging tool, in accordance with an embodiment.

FIG. 3 shows an acoustic logging tool 26 being used to take pulse-echo and flexural acoustic impedance measurements when the annulus holds a liquid (left) and gas (right). The acoustic logging tool 26 may include a pulse-echo transducer (emitter/receiver) 210 that generates and emits pulse acoustic waves 212 outward from the acoustic logging tool 26 towards a casing 214, annulus 216, and/or geological formation 14. In one or more embodiments, the acoustic logging tool 26 is positioned in a manner that allows the pulse acoustic waves 212 to travel outward normally to the casing wall in such a manner that upon contact with a surface (casing inner wall), at least a significant portion of the pulse acoustic waves 212 are reflected back to the pulse-echo emitter/receiver 210. In one or more embodiments, the pulse-echo emitter/receiver 210 may store measurements on a storage device located in the acoustic logging tool 26 to later be transferred to the data processing system 38. In one or more embodiments, the pulse-echo emitter/receiver 210 may send the measurements directly to the data processing system 38.

The acoustic logging tool 26 may also include a flex-emitter 218 and at least a flex-receiver 220 offset from the flex-emitter along the longitudinal axis of the tool. In some other implementations, the acoustic logging tool includes two or more flex-receivers 220 situated at different distances from the flex-emitter 218 along the longitudinal distance. The flex-emitter 218 may be located at one end of the acoustic logging tool 26 and emit flexural waves 222 (e.g., 222A in the example on the left and 222B in the example on the right) outwardly from the acoustic logging tool 26 towards the geological formation 14. The flex-emitter 218 may be positioned at an angle within the acoustic logging tool 26. For example, the flex-emitter 218 may be located in the lower half of the acoustic logging tool 26 and be placed at an upward angle of 45° (e.g., the flex-emitter is positioned to emit flexural waves that reflect towards the upper half of the acoustic logging tool). The flex-receiver 220 may be located on the opposite end of the acoustic logging tool 26 from the flex-emitter 218. As with the flex-emitter 218, the flex-receiver 220 may be positioned at an angle to receive the flexural waves 222 emitted by the flex-emitter 218. For example, the flex-receiver 220 may be located in the upper half of the acoustic logging tool 26 and be placed at a downward angle of 45° (e.g., the flex-receiver is positioned to receive flexural waves that are reflected off the annulus or geological formation).

The pulse-echo waves 212 and the flexural waves 222 may reflect off of the geological formation 14 or the casing 214 depending on the state of matter located within the annulus 216. As shown in FIG. 3, the pulse-echo waves 212 and the flexural waves 222 may travel through both the casing 214 and the annulus 216 to reflect off the geological formation 14 if the annulus 216 has liquid. In the case of gas within the annulus 216, the pulse-echo waves 212 and the flexural waves 222 may reflect off the casing 214 but may not travel through the annulus 216 to the geological formation 14.

Waveforms resulting from the pulse echo and flexural measurements in case of liquid and gas composition of the annulus are shown on FIG. 3 at 212A-B (pulse-echo measurements) & 222A-B (flexural measurements). As can be seen, the pulse echo response waveforms 212A & 212B have a similar profile. The low acoustic impedance generated from the pulse-echo waves 212 in a gas annulus 216 may be between 0 to 0.3 MRayl. The low acoustic impedance generated from the pulse-echo waves 212 in a liquid annulus 216 may be around 0.8 MRayl or higher. Debonded solids (e.g., debonded cement) with dry micro-annulus may also have similar acoustic impedance values as gas and liquid. The flexural waveforms 222A & 222B obtained in response to a measurement in a gas-filled annulus (222B) or liquid-filled annulus (222A) differ greatly in view of the third interface echo 222C present when the annulus is liquid-filled but not when it is gas-filled.

The pulse echo tool calibration generally includes an operation called free pipe normalization, during which the pulse echo measurement is calibrated in a free pipe zone in which the composition of the annulus is supposedly well-known. However, the assumption of the nature of the fluid in the annulus is not always accurate. As the characteristics of liquid-filled and gas-filled measurements are quite similar from the perspective of the pulse-echo measurement, the wrong assumption is not always detected. Should the calibration occur with a wrong assumption, a systematic bias reaching beyond 1-2 MRayl values would be introduced, leading consequently to a wrong interpretation. For such cases it is handy to have an additional TIE measurement. Here, TIE serves as a simple and robust discriminator that enables to check validity of the assumption made regarding the nature of the fluid contained in the annulus, as it is present and prominent for the liquid annulus and absent for the gas-filled one. Further, the TIE measurement may also be used as a quality check for the composition of the annulus that is determined using pulse-echo measurements.

Figure 5:
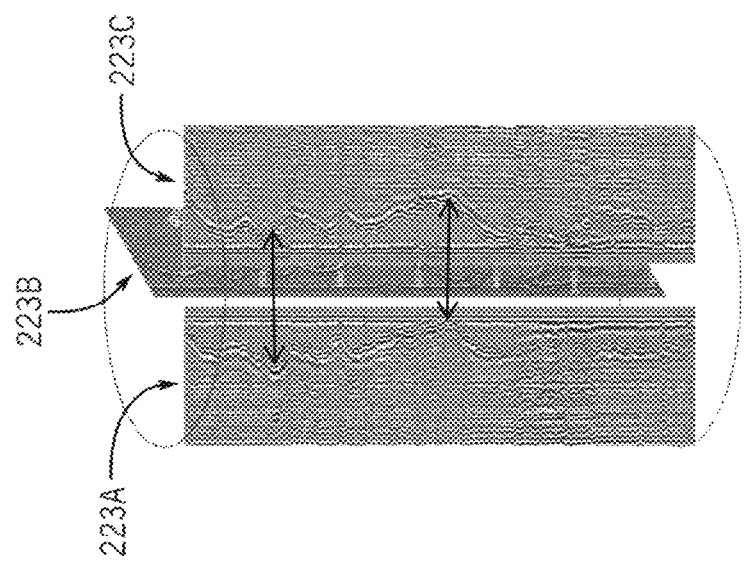
FIG. 5 is a diagram of showing a plurality of acoustic well log views taken at a plurality of azimuths of a wellbore, in accordance with an embodiment.
Figure 4:
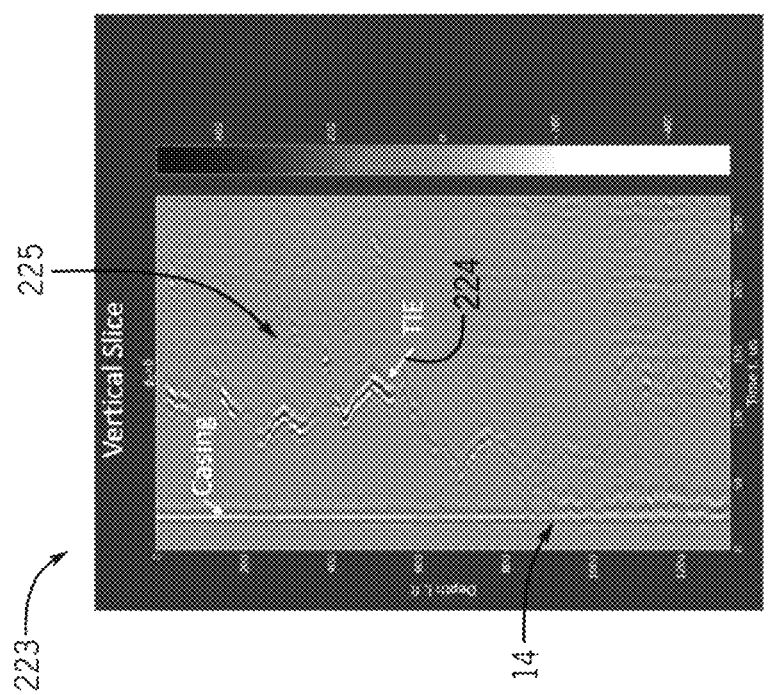
FIG. 4 is a diagram of an acoustic well log with a TIE, in accordance with an embodiment.

FIG. 4 shows an example of a well log 223 representing waveforms taken at different positions in the wellbore as a function of time (in ordinate) and of depth (in abscissa). A TIE 224 may be identified according to objective criteria that may avoid the occasional unreliability of relying on human judgment. In the example of FIGS. 4 and 5, objective methods may be used to separate the TIE 224 from background signals 225 on the well log view 223. To do so, multiple well log views 223 from different azimuths and/or times may be obtained. FIG. 5 illustrates schematically how multiple well log views 223 (here, shown as well log views 223A, 223B, and 223C) may be obtained from different azimuths. While three well log views 223 are illustrated by way of example in FIG. 5, there may be at least two and up to tens, hundreds, or thousands of azimuthal well log views 223 obtained at different times, depths, and/or azimuths.

Figure 6:
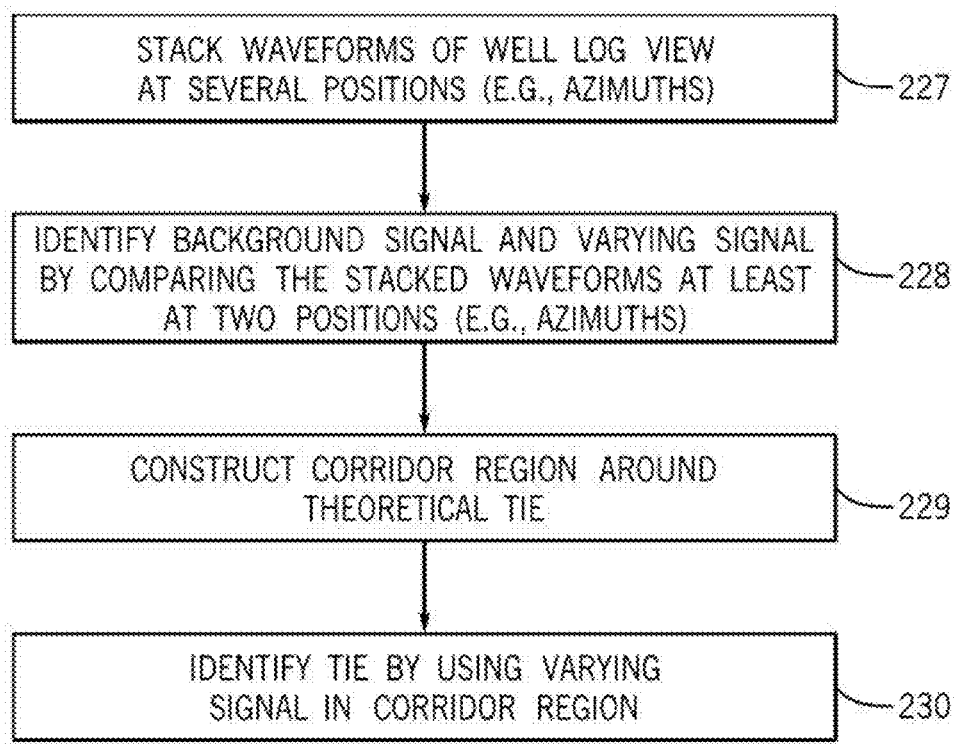
FIG. 6 is a flowchart of a method to objectively identify a TIE, in accordance with an embodiment.

A physics-based method for identifying the TIE 224 is described in a flowchart in FIG. 6. The waveforms from the well log views 223 may be stacked together (operation 227). The stacking may be performed vs time and depth for a given azimuth in the wellbore. Then, the stacked waveforms at one azimuth are compared to the stacked waveform at another azimuth, in particular the neighbor azimuth, in order to identify the portions of the waveforms that do not vary when the azimuth varies.

The comparison between waveforms of one azimuth to another may be performed using a motion detection algorithm, to provide one example. The portions of the signal that do not show variation may be considered a background signal of other nature. The varying portions of the signal depend on the configuration of the wellbore and include the TIE. Such varying portions are detected thanks to the comparison and highlighted as part of the processing (operation 228). In operation 229, the signal is further analyzed at different azimuths. For instance, the waveforms may be analyzed at each given depth using a well log view showing the waveforms versus time and azimuths and/or using two well log views of the waveforms versus depths taken at two different azimuths (e.g., opposing azimuths). By detecting the TIE at one or several positions, one may derive the eccentering of the casing relative to the borehole formed in the geological formation and a theoretical location in time of the TIE for each depth and azimuth—the TIE location in time is directly linked to such eccentering.

Figure 7:
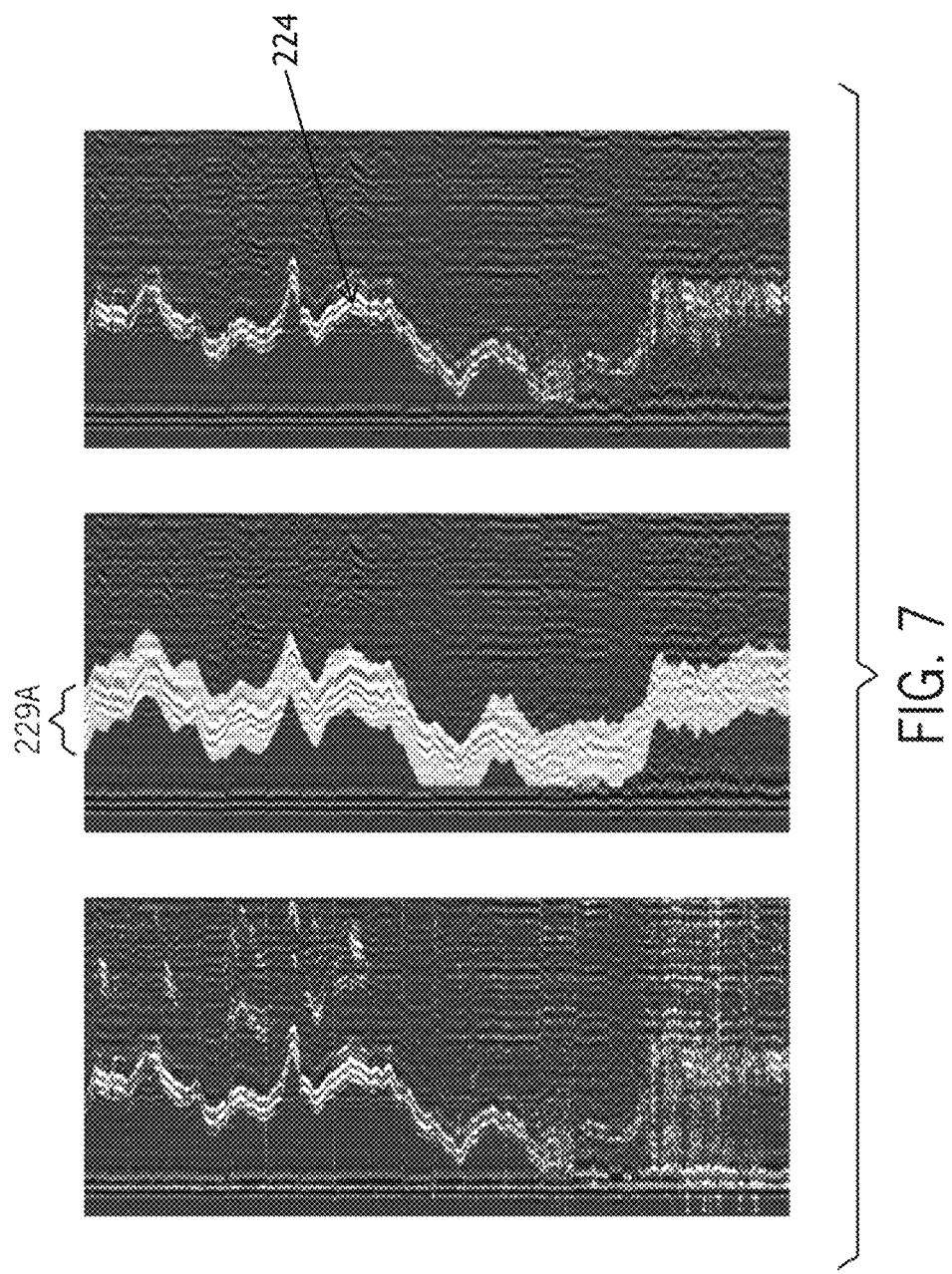
FIG. 7 is a diagram illustrating acoustic well logs that may be used in the method of the flowchart of FIG. 6, in accordance with an embodiment.

FIG. 7 shows a single stacked waveform processed according to the flowchart of FIG. 6. The left image shows the stacked waveform as a result of the measurement. The middle image shows the stacked waveform processed according to operation 228 & 229 of the flowchart of FIG. 6. As we can see, some background noise has been eliminated from the middle image thanks to the operation 228. Further, as explained hereinabove in relationship with operation 229, such a stacked waveform is processed along a second single stacked waveforms taken in the same section of the wellbore at first and second opposing azimuths (e.g., 223A and 223C of FIG. 5) to determine corridor region 229A. It can be seen on FIG. 5 that the sum of the two stacked waveforms produces a sum of durations between main echo and TIE (or between the fired pulse and the TIE) that is quasi-constant, as can be highlighted by the arrows shown on FIG. 5 that each extends between the TIEs at the first and second opposing azimuths of the same depth for better visualization. That is, when the duration is long at one azimuth it is short at the opposing azimuth. This is because the casing is eccentered in the wellbore. Casing eccentering within the formation may be derived from such analysis (or from any other techniques) and the theoretical location in time of the TIE at each depth and azimuth may be obtained (for instance using modelling or experiment). A corridor region 229A may be constructed around this theoretical location in time on the well log view 223 (operation 229 of FIG. 6; example waveform resulting from operation 229 shown in FIG. 7). The corridor region 229A may be, for example, a confidence region accounting for uncertainties when calculating the TIE theoretical location. It is to be noted that operation 229 is independent of operation 228 and that it may be conducted in parallel with operation 228 or before operation 228.

The TIE 224 is thereafter identified at a particular location in time, namely, when the location in time has been identified as a varying signal as part of operation 228 and is located in the corridor determined at operation 229 (operation 230). The right image of FIG. 7 shows the detection of TIE 224 where significant variation of amplitude after elimination of background noise happens in the corridor.

Figure 8:
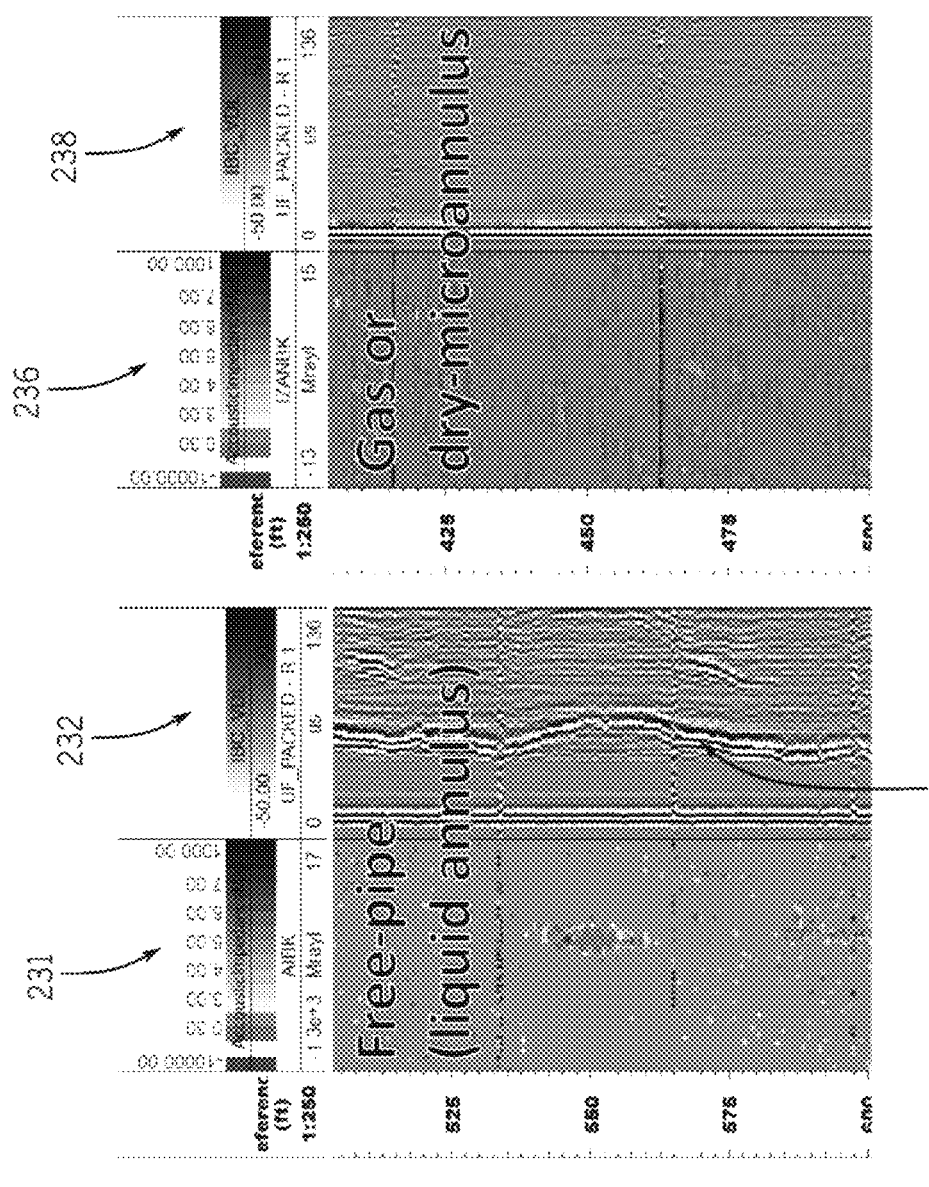
FIG. 8 is a diagram of acoustic well logs for a liquid annulus and gas annulus, in accordance with an embodiment.

To further illustrate the measurements from pulse-echo waves 212 and the flexural waves 222, FIG. 8 shows multiple well log views 231, 232, 236, and 238 of acoustic impedance measurements (231, 236) vs. depth and azimuth and flexural measurements (232, 238) vs. depth and time of the wellbore in both a liquid annulus (231, 232) and a gas annulus (236, 238). The well log views 231, 232 and respectively 236, 238 are taken in the same portion of the well by a tool including a pulse-echo measurement, such as a rotating pulse-echo sub, and a flexural measurement. Such tool may be an Isolation Scanner™ tool, commercialized by Schlumberger.

The first well log view 231 shows pulse echo acoustic impedance (AIBK) plotted against depth and azimuth. The AIBK measurements are taken from the pulse-echo receiver/emitter 210 and are measured in MRayls and plotted vs depth and azimuth of the well measured in feet. The well log view 231 may show the AIBK measurements in a particular color to identify liquid in the annulus 216 at the given depth. Such correspondence from acoustic impedance to type of liquid may be made using any suitable techniques such as using a Solid Liquid Gas map.

The second well log view 232 shows measurements taken from the flex-emitter 218 and flex-receiver 220 using flexural waves 222. These measurements are displayed as variable density (VDL) waveforms, which may be a continuous-depth time display of full-waveform amplitude presented as shades of black and white. Positive waveform amplitudes may be shown as dark bands and negative amplitudes as gray or white bands. As can be seen in the second well log view 232, the plot of the flexural waves 222 produce third interface echoes (TIEs) 234 on the well log view 232. The TIEs 234 may be identified by a trace (e.g., the dark bands) that is well pronounced and may be far apart from the main flex wave echoes. The shape of the TIE curve corresponding to variation of the arrival time of the TIE plotted along a dimension of the borehole is indicative of the relative casing-formation distance and the type of fluid. On this figure the TIE curve is plotted versus depth but similar indication may be obtained when the TIE curve is plotted against azimuth. When the annulus is a liquid, the TIE curve has a continuous shape, ie the arrival time of the TIE varies continuously along the dimension of the borehole.

The third well log view 236 shows pulse echo acoustic impedance (AIBK) plotted against depth and azimuth in another section of the wellbore having a gas or dry-microannulus. The AIBK measurements are taken from the pulse-echo receiver/emitter 210 and are measured in MRayls and plotted vs azimuth and depth of the well measured in feet. The well log view 236 may show the AIBK measurements in a particular color (e.g., a different color than used to identify liquid) to identify gas in the annulus 216 at the given depth.

The fourth well log view 238 shows measurements obtained by the flex-emitter 218 and flex-receiver 220 using flexural waves 222. These measurements are displayed as variable density (VDL) waveforms as in the second well log view 232. As can be seen in the fourth well log view 232, the plot shows that the flexural waves 222 do not produce TIEs due to the annulus being filled with gas.

Figure 9:
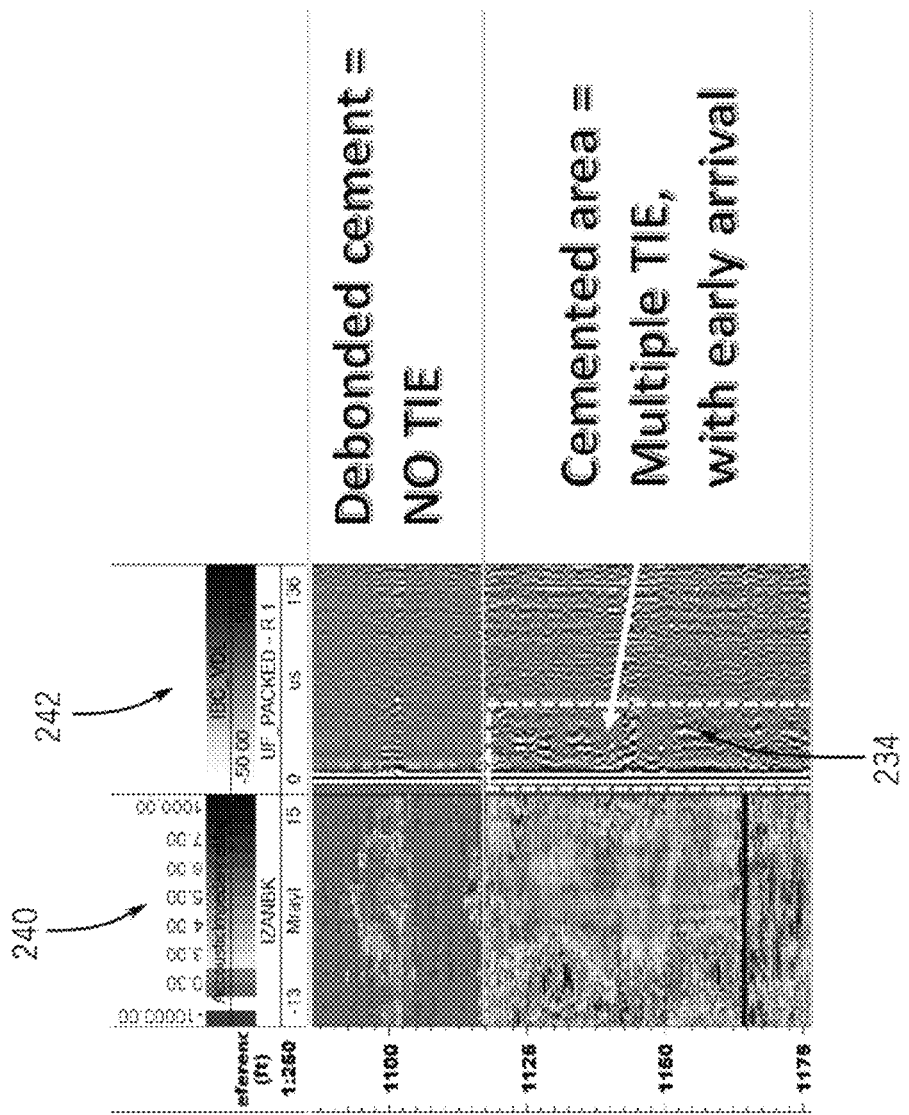
FIG. 9 is a diagram of an acoustic well logs for a solid annulus, in accordance with an embodiment.

FIG. 9 shows multiple well log views 240 and 242 of acoustic impedance measurements vs. the depth of the wellbore for a debonded cement and cement annulus 216, taken in the same well by a pulse echo measurement device (240) and a flexural measurement device (242). As shown in the first well log view 240, the upper portion of the well log view (e.g., a depth up to about 1,118 ft) is a debonded cement mixture. The debonded cement is a mixture of gas (e.g., a plotted area of a first color), liquid (e.g., a plotted area of a second color), and solid (e.g., a plotted area of a third color). The debonded cement may be cement that did not properly set in the annulus 216. For example, a well log view with a mixture of gas, solid, and liquid may imply that the cement was the wrong type or consistency, and/or that fluid channels have formed in the cement. The bottom portion of the first well log view 240 shows a cemented area that is mainly solid with small pockets of gas and liquid.

The second well log view 242 displays the VDL waveforms from the measurements obtained by the flex-emitter 218 and flex-receiver 220 using flexural waves 222. Similar to the gas annulus well log view in FIG. 6, the debonded cement portion (e.g., the portion with a depth up to about 1,118 ft) of the second well log view 242 has no visible TIEs due to a predominant measurement of gas in the annulus. The lower portion of the second well log view 242 displays multiple TIEs as a result of the solid cemented area. In this section, TIE is heterogeneous and has a complex structure. Indeed, in solids, TIE is generally close to the main-echo, as the sound velocity in solids is higher and heterogeneous due to different modes of wave propagation in solids. In this case, the TIE curve (i.e., arrival times versus depth) has a complex structure due to different modes of propagations and the arrival time of the TIE varies discontinuously.

In view of the above, the presence of TIE enables the identification of a first characteristic of the borehole, the first characteristic being the annulus containing a liquid or a solid. The variation of the arrival times of the TIE also enables discrimination between the solid and liquid as the liquid is identified if the TIE arrival time variation is continuous whereas the solid is identified if the TIE arrival time has a discontinuous variation. The absence of TIE enables the identification of a second characteristic of the borehole, the second characteristic being the annulus containing gas, such as including a dry microannulus.

The TIEs 234 may be identifiable due to the change in amplitude. However, identifying TIEs 234 may be a challenge due to small changes in amplitude, background noise, different time references, etc. The methods according to the current disclosure may enable to identify TIE in any configuration.

Figure 10:
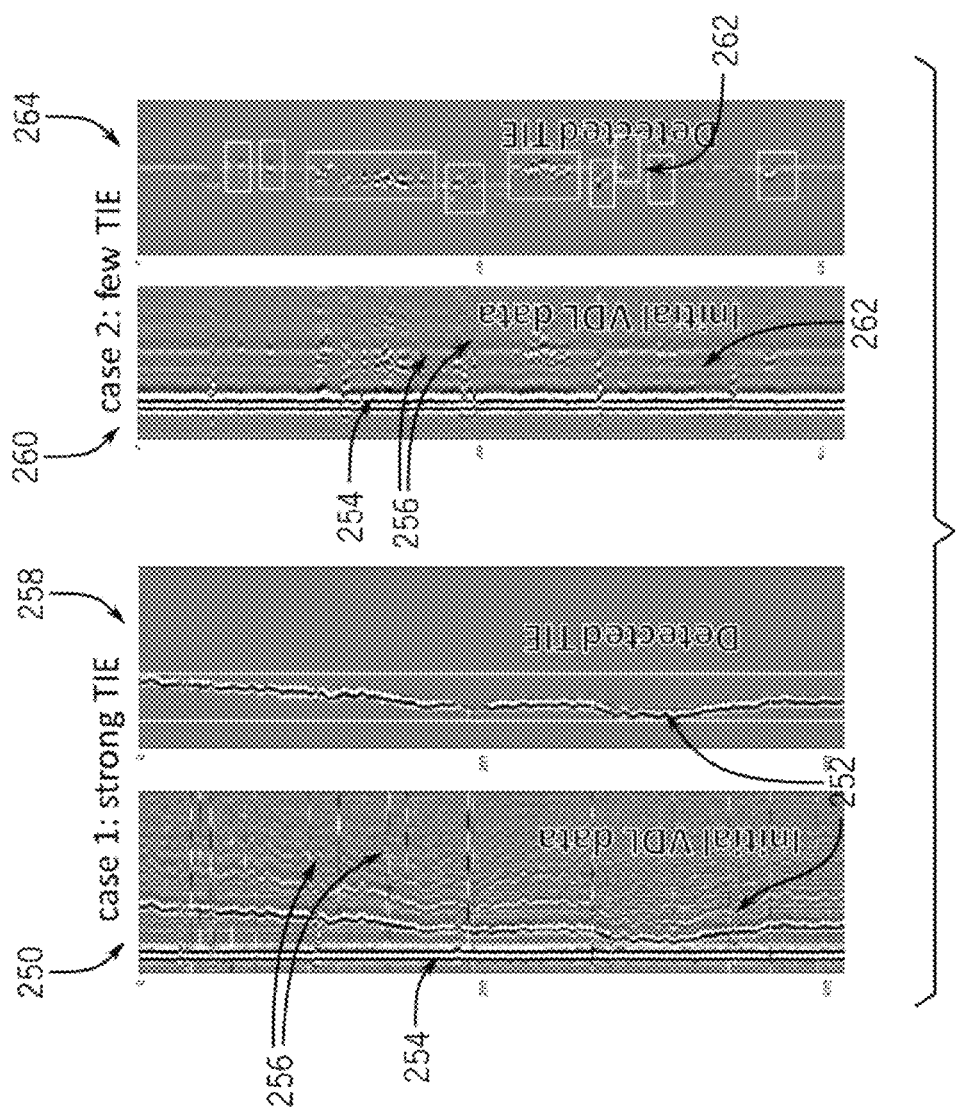
FIG. 10 is a diagram of acoustic well logs showing third interface echoes (TIEs), in accordance with an embodiment.

To alleviate some of the issues of identifying TIEs 234, FIG. 10 shows two well log views with removed signals that may interfere with detecting TIEs 234. The first well log view 250 is an example of a case with a strong TIE 252 that may be identified from the initial VDL data. The first well log view 250 shows the received waveforms while the second well log view show only the TIE. The strong TIE 252 may be identifiable in the first well log view 250.

A third well log view 260 shows an example of a case with multiple TIEs 262, such as from a cemented annulus. The multiple TIEs 262 are less pronounced than the strong TIE 252 in the first well log view 250 due to the background noise 256 from the initial VDL data. The third well log view 260 shows the entire received waveforms including the received flex 254 from the emitted flexural waves 222. The fourth well log view 264 shows the multiple TIEs 262 without the flex 254 and background noise 256. In this case, detecting the TIE visually is difficult for the operator and the workflows described in the current disclosure greatly help.

Figure 11:
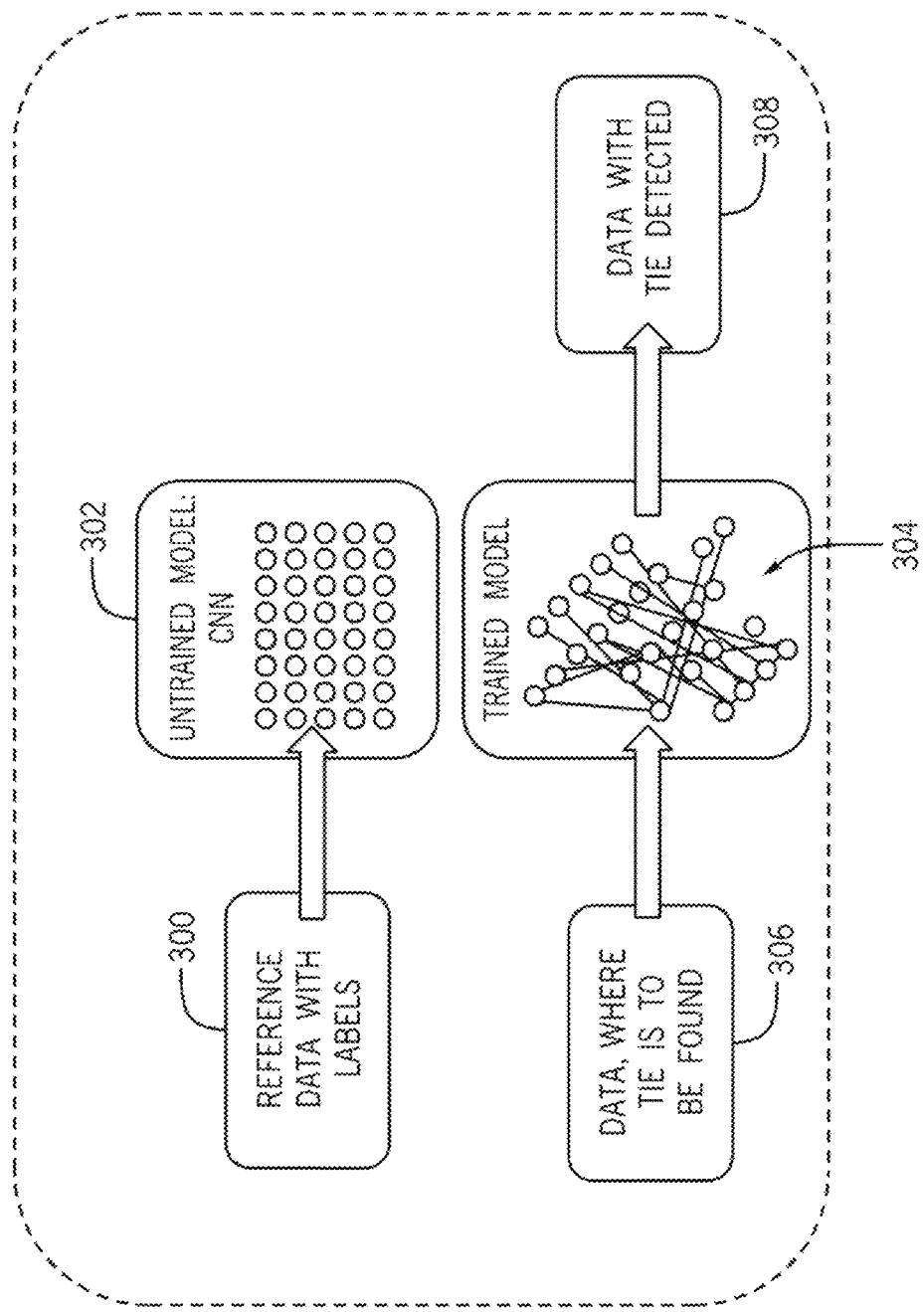
FIG. 11 is a diagram of a trained neural network model detecting TIEs, in accordance with an embodiment.

To provide further efficiency to the process of identifying TIEs, FIG. 11 shows a diagram for training a neural network to identify TIEs. Initial reference data 300 may collected of previously identified TIEs from impedance sensor readings from multiple wellbores. In one or more embodiments, the reference data 300 may be images of well log views with TIEs or without TIEs. The well log views may also include the background noise or have the background noise removed, as previously discussed with reference to FIG. 10. The TIEs on the images may be labeled. For example, an image with TIEs may include a box around the TIE, a bold line over the TIE, or a title for the image, such as "Detected TIE" or "TIE Detected". The input may be a pair of images including the image directly obtained from the flexural measurement device (well log views) or obtained and processed for removing background noise and a binary images that display the TIE in white and show black otherwise (e.g., no background noise, flex). The binary images may be obtained using manual selection of the user or using the method discussed above and may be considered as labels of the well log images.

The reference data 300 is sent to an untrained neural network model 302, such as a residual neural network, a convolution neural network (CNN), a deep neural network, a feedforward artificial neural network, or any other type of neural network. The untrained neural network 302 may be trained on a data processing system, such as a server, computer, laptop, or the data processing system described in FIG. 1, or any other suitable processing circuitry (e.g., tensor circuitry, a field programmable gate array (FPGA) programmed to operate as a neural network model, an artificial intelligence processing element array). The neural network may analyze each well log view image as multiple smaller images at a set width and height. The labeled images from the reference data 300 may be used as input for the untrained neural network model 302 to assist in identifying TIEs on well log views. In one or more embodiments, the untrained neural network 302 may receive generated simulated well log view images from a simulated environment as part as the reference data 300. In some cases, the neural network may operate in conjunction with another neural network as a generative adversarial network (GAN). The training may be supervised or unsupervised (e.g., free of human intervention). In one or more embodiments, the untrained neural network model 302 has multiple layers (e.g., input layer, hidden layers, output layer). The hidden layers may be convolutional layers that convolve with multiplication or dot product. The neural network may be trained to identify low-level and mid-level objects on the images (e.g., geometric forms, textures, primitive objects, small objects). For example, a hidden layer may be a convolutional layer that focuses on edges and blobs and/or a hidden layer may be focused on texture. Multiple convolutional layers may be used to focus on different aspects of the image until an object on the image may be classified. The classified object may be highlighted on a separate image and sent to the output layer to display to a user or a display device.

The untrained neural network model 302 may be trained using reference data until a specified accuracy threshold is reached. The specified accuracy threshold may be based on the accuracy of identifying TIEs or no TIEs, for instance within a testing set of labelled data that has not been used for training the neural network. The specified accuracy threshold may be any percentage value accuracy, such as 50%, 60%, 90%, 95%, 96%, etc. For example, the untrained neural network model 302 may be trained until an accuracy threshold of 95% is reached in identifying TIEs or no TIEs. When the untrained neural network model 302 reaches the specified accuracy threshold, the untrained neural network model may be deployed as a trained neural network model 304. For example, the trained neural network model 304 may be a CNN that is deployed on a data processing system 38. The trained neural network model 304 may receive data 306 from a wellbore in the form of well log view images that have yet to be analyzed. The trained neural network model 304 may be deployed on data processing systems, such as the data processing system described in FIG. 1, that are located across multiple wellbores to analyze data 306 in real time. In one or more embodiments, the trained neural network model 304 is deployed on the data processing system 38 and may receive data 306 from an acoustic logging tool 26 from the wellbore. The data 306 may be processed to be of the same nature as the reference data 300 (for instance, same size of image, same type of processing (if any) performed on the images). The trained neural network 304 allows for data 306 to be reviewed at the wellbore and may reduce human error. In one or more embodiments, the neural trained neural network 304 may be used to double check if the material behind the annulus received from the data is identified correctly. As the data 306 is received, the trained neural network model 304 may output identified TIEs 308 on a well log view image.

Figure 12:
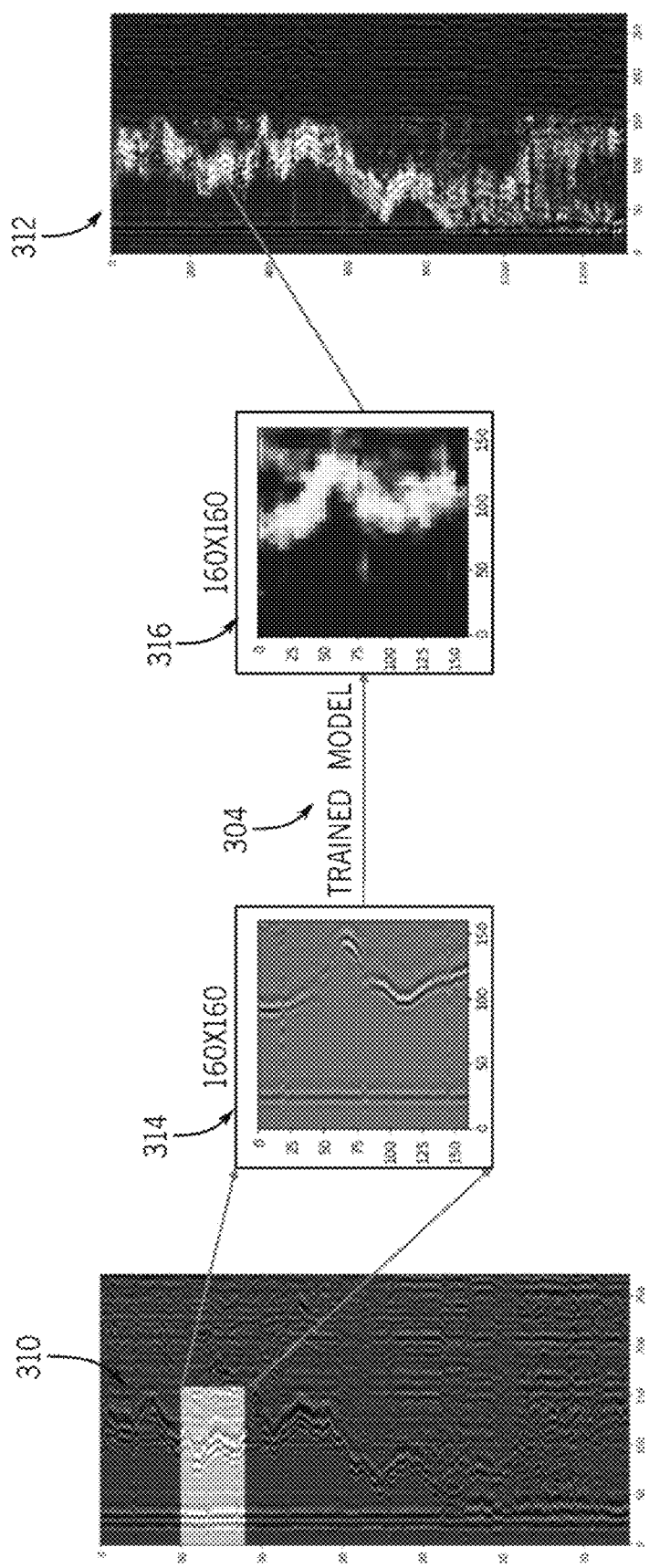
FIG. 12 is a diagram of an example of a trained neural network model using images to detect TIEs, in accordance with an embodiment.

FIG. 12 shows an example of a trained neural network model 304 receiving a well log view image 310 and outputting a modified well log view image 312. The well log view image 310 may be acoustic impedance data obtained from an acoustic logging tool in a wellbore, in particular waveforms obtained from the flexural measurement versus time and depth. The well log view image 310 may show signs of TIEs and include background noise and flexural main echo in the image. As such, the well log view image 310 may be cropped into image portions 314 that include only a small portion of the well log view image 310. Each image portion 314 may be a designated size, such as 10×10 pixels, 100×100 pixels, 160×160 pixels, 350×350 pixels, or 480×480 pixels, to name a few examples. The neural network model 304 may filter out may filter out background noise image portion 314. In one example, the image portion 314 may be converted into a grayscale image (e.g., a gray monochrome where each pixel represents a strength of an amplitude of the acoustic cement evaluation data ranging from a minimum (black) to a maximum (white)). Each image portion 314 may be sent to the trained neural network model 304 for analysis of TIEs. The trained neural network model 304 may identify TIEs by shading TIE lines on the original image portion 314 to produce an output of a shaded image portion 316. Each shaded image portion 316 may be reassembled to produce a modified well log view image 312 that identifies the TIE lines.

It is to be understood that in this application, the well log views that have been shown represent the waveforms versus time and depth; however, the method is also applicable to images of the waveforms versus azimuth if such images are available as reference and input data.

Figure 13:
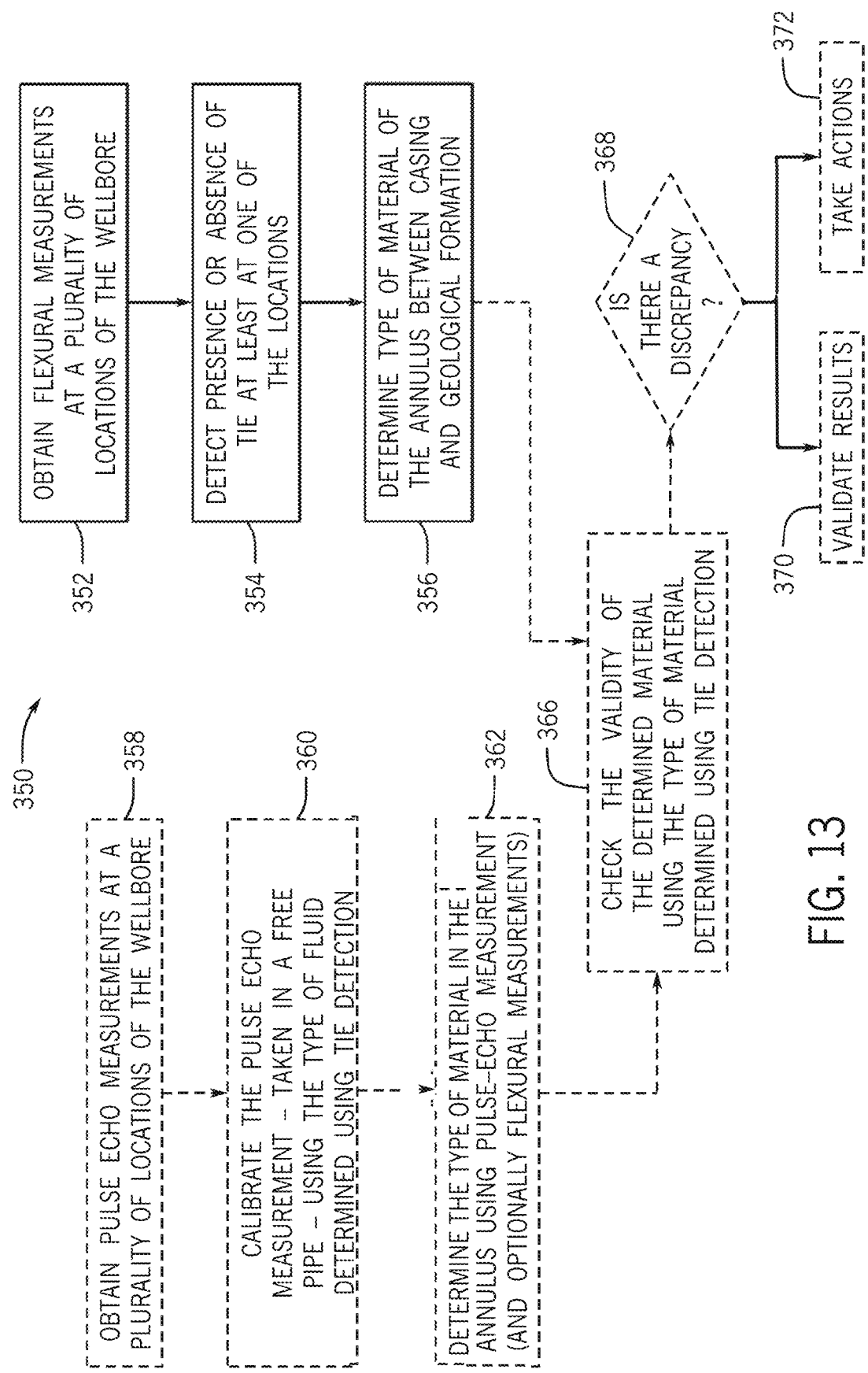
FIG. 13 is a flowchart of a method for using flexural measurements in combination with pulse echo measurements to validate a determined characteristic of the annulus based on the presence or absence of a third interface echo, in accordance with an embodiment.

A method shown on FIG. 13 shows an example overall method 350 to detect a type of fluid in the annulus between the casing and the formation. The method includes obtaining flexural measurements of a plurality of positions in a borehole (block 352). The plurality of positions may be a plurality of positions at different depths and/or azimuths. Obtaining flexural measurements includes recording a waveform versus time for each position. Such waveforms may be shown as images as a function of time and position in the wellbore (for instance versus depth or azimuth).

The method includes detecting the presence or absence of TIE at least at one position using the measurements (block 354). Detecting the presence or absence of TIE may be performed using physics-based or machine-learning methods as described above, based in particular on images of the flexural measurement as a function of time and position in the wellbore. The methods described above enable performing TIE detection automatically (i.e., without human intervention) for each position.

Based on the presence or absence of TIE, the type of material in the annulus between the casing and the geological formation is determined (block 356). In particular, if TIE is detected at a particular position (i.e., depth and/or azimuth) of the wellbore, the composition of the annulus is identified as liquid or solid at this position. By contrast, if no TIE is detected, the annulus is identified as gas-filled. When a TIE is detected, determining the type of material may include analyzing the characteristics of the detected TIE (e.g., amplitude, phase) to determine the properties of the material situated in the annulus (e.g., liquid or solid, and which type of solid) using different known methods. Such analysis would enable discrimination of liquid from solid and different liquids/solids from one another, and bring more robustness to the overall method. However, the TIE presence or absence alone is already a strong indicator in many cases.

In one particular embodiment, the method also includes obtaining a pulse-echo measurement using a pulse-echo measurement device (block 358) and calibrating the pulse-echo measurement using the determination of type of material (block 360). In this embodiment, the pulse-echo measurement is obtained in a free pipe zone, and is called free pipe normalization. The response of the pulse-echo measurement is adjusted (or corrected or normalized) as a function of the type of material determined based on the TIE (i.e., if the TIE is present, the material in the free pipe is identified as liquid; otherwise, it is identified as gas). In an embodiment, this operation includes assuming the material in the annulus at the free pipe normalization position based on common knowledge of the wellbore and checking the validity of the assumption using the TIE. Once the material used for calibration has been validated, the pulse echo measurements are calibrated/normalized based on the expected results for this material. The same correction or normalization will be applied to the responses of the pulse echo obtained elsewhere in the borehole.

Alternatively or additionally, the method also includes determining at least based on pulse-echo measurement (and in particular acoustic impedance determined based on the pulse-echo measurements) the type of material in the annulus (block 362). The type of the material may be determined based on pulse-echo measurements and on flexural measurements (and, in particular, using acoustic impedance determined based on the pulse-echo measurements and flexural attenuation determined based on the flexural measurements). In the latter case, this may be determined using a solid-liquid-gas map as explained in previous publications, such as U.S. Ser. No. 10/378,341 for instance, which is incorporated by reference in its entirety for all purposes. The method may also include checking the quality of the result using the type of material determined using the TIE (block 366). If there is a discrepancy between both results (block 368), an action may be recommended or performed (manually or automatically). Such action may include alerting the user so that the user can analyze in more detail the discrepancy and/or automatic correction (e.g., reprocessing the flexural measurement well log image to identify if there are other indications in the waveforms that suggest the presence or absence of the third interface echo). For instance, there may be a discrepancy in a particular position surrounded by positions where the results do not show discrepancy. Other actions may include correcting the normalization performed during calibration and/or updating a job plan to plan an additional calibration (e.g., additional free pipe normalization). If both results are the same, the result is validated (block 372).

EXAMPLE EMBODIMENTS

The systems, methods, and computer program products of this disclosure may take a variety of embodiments. A non-limiting set of example embodiments is provided below.

EXAMPLE EMBODIMENT 1. A system comprising:
an acoustic logging tool configured to obtain flexural measurements in a wellbore crossing a geological formation and having a casing installed inside the wellbore; and
a data processing system comprising a processor configured to:
receive the flexural measurements;
produce a well log view image using the flexural measurements that includes flexural waveforms in a plurality of positions versus time;
process the well log view image to identify a presence or absence of a third interface echo;
in response to identifying the presence of the third interface echo, identify an annulus between the casing and the geological formation as having a first characteristic; and
in response to identifying the absence of the third interface echo, identify the annulus between the casing and the geological formation as having a second characteristic.

EXAMPLE EMBODIMENT 2. The system of example embodiment 1, wherein the first characteristic of the annulus comprises a presence of a liquid or a solid in the annulus.

EXAMPLE EMBODIMENT 3. The system of example embodiment 2, wherein the data processing system is configured to discriminate between the presence of the solid or the liquid in the annulus based on a variation of arrival time of the third interface echo along a dimension of the borehole.

EXAMPLE EMBODIMENT 4. The system of example embodiment 3, wherein the data processing system is configured to identify the presence of the liquid when the third interface echo has a continuous variation and identify the presence of the solid when the third interface echo has a discontinuous variation.

EXAMPLE EMBODIMENT 5. The system of example embodiment 1, wherein the second characteristic of the annulus comprises a presence of a gas in the annulus.

EXAMPLE EMBODIMENT 6. The system of example embodiment 1, wherein the second characteristic of the annulus defines the annulus as a dry microannulus.

EXAMPLE EMBODIMENT 7. The system of example embodiment 1, wherein the acoustic logging tool is configured to obtain pulse echo measurements and the data processing system is configured to:
receive the pulse echo measurements; and
process the pulse echo measurements to identify that the annulus between the casing and the geological formation has the first characteristic or the second characteristic.

EXAMPLE EMBODIMENT 8. The system of example embodiment 7, wherein the data processing system is configured to:
additionally receive pulse-echo calibration measurements, wherein the pulse-echo calibration measurements are taken at a calibration location corresponding to a free pipe;
receive flexural measurements taken at the calibration location;
identify the annulus between the casing and the geological formation in the calibration location as having the first or the second characteristic; and
calibrate the pulse-echo measurements based on the first or second characteristic identification and the pulse-echo calibration measurements.

EXAMPLE EMBODIMENT 9. The system of example embodiment 7, wherein the data processing system is configured to:
in response to identifying that the annulus has the first characteristic using the pulse echo measurements or identifying that the annulus has the second characteristic using the pulse echo measurements:
using the flexural measurements, check a validity of the identification of the first characteristic or the second characteristic using the third interface echo presence or absence identification.

EXAMPLE EMBODIMENT 10. The system of example embodiment 9, wherein the data processing system is configured to:
in response to identifying that the annulus has the first characteristic using the pulse echo measurements and identifying that the annulus has the second characteristic using the flexural measurements or in response to identifying that the annulus has the second characteristic using the pulse echo measurements and identifying that the annulus has the first characteristic using the flexural measurements, perform an action to increase a likelihood that the first characteristic or the second characteristic will be properly identified.

EXAMPLE EMBODIMENT 11. The system of example embodiment 10, wherein performing the action comprises at least one of the following:
alerting a user so that the user can analyze the pulse echo measurements or the flexural measurements in more detail;
reprocessing the well log view image to analyze nearby positions to confirm the absence or presence of the third interface echo;
correcting a normalization performed during a calibration of the pulse echo measurements;
updating a job plan to plan an additional calibration of the pulse echo measurements; or
any combination thereof.

EXAMPLE EMBODIMENT 12. The system of example embodiment 1, wherein the data processing system is configured so that processing the well log view image includes:
sending the well log view image to a neural network, wherein the neural network is trained to identify a third interface echo (TIE); and
receiving a modified well log view image from the neural network, wherein the modified well log view image includes an indication of a presence of a TIE.

EXAMPLE EMBODIMENT 13. The system of example embodiment 12, wherein the neural network comprises a convolutional neural network (CNN).

EXAMPLE EMBODIMENT 14. The system of example embodiment 1, wherein the data processing system is configured to produce several well log views representative of measurements vs. time and depth obtained at multiple azimuths, and wherein the data processing system is configured so that processing the flexural measurements comprises:
stacking flexural waveforms obtained at the multiple azimuths;
identifying a background signal and a varying signal by comparing the stacked waveforms at least in two of the multiple azimuths;
constructing a corridor region around a theoretical third interface echo among the flexural waveforms; and
identifying the third interface echo based at least in part on a presence of the varying signal within the corridor region.

EXAMPLE EMBODIMENT 15. The system of example embodiment 14, wherein the data processing system is configured to determine casing eccentricity and construct the corridor region based on the determined casing eccentricity.

EXAMPLE EMBODIMENT 16. A method comprising:

receiving, into processing circuitry, flexural measurements obtained from an acoustic logging tool in a wellbore that crosses a geological formation and has a casing installed inside the wellbore;

producing, using the processing circuitry, a well log view image using the flexural measurements that includes flexural waveforms in a plurality of positions versus time;

processing, using the processing circuitry, the well log view image to identify a presence or absence of a third interface echo;

in response to identifying the presence of the third interface echo, using the processing circuitry to identify an annulus between the casing and the geological formation as having a first characteristic; and in response to identifying the absence of the third interface echo, using the processing circuitry to identify the annulus between the casing and the geological formation as having a second characteristic.

EXAMPLE EMBODIMENT 17. The method of example embodiment 16, wherein the first characteristic of the annulus comprises a presence of a liquid or a solid in the annulus and the method comprises:

discriminating between the presence of the solid or the liquid in the annulus using the processing circuitry based on a variation of arrival time of the third interface echo along a dimension of the borehole, the presence of the liquid is identified when the third interface echo has a continuous variation and the presence of the solid is identified when the third interface echo has a discontinuous variation.

EXAMPLE EMBODIMENT 18. The method of example embodiment 16, wherein the second characteristic of the annulus comprises a presence of a gas in the annulus or a definition of the annulus as a dry microannulus.

EXAMPLE EMBODIMENT 19. The method of example embodiment 16, comprising:

receiving, into the processing circuitry, pulse echo measurements obtained from the acoustic logging tool; and processing, using the processing circuitry, the pulse echo measurements to identify that the annulus between the casing and the geological formation has the first characteristic or the second characteristic.

EXAMPLE EMBODIMENT 20. The method of example embodiment 19, comprising:

receiving, into the processing circuitry, pulse-echo calibration measurements obtained by the acoustic logging tool at a calibration location corresponding to a free pipe, receiving, into the processing circuitry, flexural measurements obtained by the acoustic logging tool at the calibration location;

identifying, using the processing circuitry, the annulus between the casing and the geological formation in the calibration location as having the first or the second characteristic; and calibrating, using the processing circuitry, the pulse-echo measurements based on the first or second characteristic identification and the pulse-echo calibration measurements.

EXAMPLE EMBODIMENT 21. An article of manufacture comprising one more tangible, non-transitory, machine-readable media comprising instructions that, when executed by one or more processors, cause the one or more processors to:

receive flexural measurements obtained by an acoustic logging tool in a wellbore crossing a geological formation and having a casing installed inside the wellbore;

produce a well log view image using the flexural measurements that includes flexural waveforms in a plurality of positions versus time;

process the well log view image to identify a presence or absence of a third interface echo;

in response to identifying the presence of the third interface echo, identify an annulus between the casing and the geological formation as having a first characteristic; and in response to identifying the absence of the third interface echo, identify the annulus between the casing and the geological formation as having a second characteristic.

EXAMPLE EMBODIMENT 22. The article of manufacture of example embodiment 21, wherein the first characteristic of the annulus comprises a presence of a liquid in the annulus and the second characteristic of the annulus comprises a dry microannulus or a presence of a gas in the annulus.

EXAMPLE EMBODIMENT 23. The article of manufacture of example embodiment 21, comprising instructions that, when executed by the one or more processors, cause the one or more processors to:

receive pulse echo measurements obtained by the acoustic logging tool or another acoustic logging tool in the wellbore crossing the geological formation and having the casing installed inside the wellbore; and process the pulse echo measurements to identify that the annulus between the casing and the geological formation has the first characteristic or the second characteristic.

EXAMPLE EMBODIMENT 24. The article of manufacture of example embodiment 23, comprising instructions that, when executed by the one or more processors, cause the one or more processors to:

in response to identifying that the annulus has the first characteristic using the pulse echo measurements and using the flexural measurements or identifying that the annulus has the second characteristic using the pulse echo measurements and using the flexural measurements, validate the results of the identification of the first characteristic or the second characteristic; and in response to identifying that the annulus has the first characteristic using the pulse echo measurements and identifying that the annulus has the second characteristic using the flexural measurements or in response to identifying that the annulus has the second characteristic using the pulse echo measurements and identifying that the annulus has the first characteristic using the flexural measurements:

alert a user so that the user can analyze the pulse echo measurements or the flexural measurements in more detail;

reprocess the well log view to analyze nearby positions to confirm the absence or presence of the third interface echo;

correct a normalization performed during a calibration of the pulse echo measurements; or update a job plan to plan an additional calibration of the pulse echo measurements; or any combination thereof.

EXAMPLE EMBODIMENT 25. The article of manufacture of example embodiment 21, wherein processing the well log view image to identify a presence or absence of a third interface echo comprises using a trained neural network to use image recognition to identify behavioral characteristics of the third interface echo among the flexural measurements.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:
an acoustic logging tool configured to obtain flexural measurements in a wellbore crossing a geological formation and having a casing installed inside the wellbore; and
a data processing system comprising a processor configured to:
receive the flexural measurements;
produce a well log view image using the flexural measurements that includes flexural waveforms in a plurality of positions versus time;
process the well log view image to identify a presence or absence of a third interface echo by sending the well log view image to a neural network, wherein the neural network is trained to identify a third interface echo, and by receiving a modified well log view image from the neural network, wherein, for a presence of a third interface echo, the modified well log view image includes an indication of the presence of the third interface echo;
in response to identifying the presence of the third interface echo, identify an annulus between the casing and the geological formation as having a first characteristic; and
in response to identifying the absence of the third interface echo, identify the annulus between the casing and the geological formation as having a second characteristic.

2. The system of claim 1, wherein the first characteristic of the annulus comprises a presence of a liquid or a solid in the annulus.

3. The system of claim 2, wherein the data processing system is configured to discriminate between the presence of the solid or the liquid in the annulus based on a variation of arrival time of the third interface echo along a dimension of the borehole.

4. The system of claim 3, wherein the data processing system is configured to identify the presence of the liquid when the third interface echo has a continuous variation and identify the presence of the solid when the third interface echo has a discontinuous variation.

5. The system of claim 1, wherein the second characteristic of the annulus comprises a presence of a gas in the annulus.

6. The system of claim 1, wherein the second characteristic of the annulus defines the annulus as a dry microannulus.

7. The system of claim 1, wherein the acoustic logging tool is configured to obtain pulse echo measurements and the data processing system is configured to:
receive the pulse echo measurements; and
process the pulse echo measurements to identify that the annulus between the casing and the geological formation has the first characteristic or the second characteristic.

8. The system of claim 7, wherein the data processing system is configured to:
additionally receive pulse-echo calibration measurements, wherein the pulse-echo calibration measurements are taken at a calibration location corresponding to a free pipe;
receive flexural measurements taken at the calibration location;
identify the annulus between the casing and the geological formation in the calibration location as having the first or the second characteristic; and
calibrate the pulse-echo measurements based on the first or second characteristic identification and the pulse-echo calibration measurements.

9. The system of claim 7, wherein the data processing system is configured to:
in response to identifying that the annulus has the first characteristic using the pulse echo measurements or identifying that the annulus has the second characteristic using the pulse echo measurements:
using the flexural measurements, check a validity of the identification of the first characteristic or the second characteristic using the third interface echo presence or absence identification.

10. The system of claim 9, wherein the data processing system is configured to:
in response to identifying that the annulus has the first characteristic using the pulse echo measurements and identifying that the annulus has the second characteristic using the flexural measurements or in response to identifying that the annulus has the second characteristic using the pulse echo measurements and identifying that the annulus has the first characteristic using the flexural measurements, perform an action to increase a likelihood that the first characteristic or the second characteristic will be properly identified.

11. The system of claim 10, wherein performing the action comprises at least one of the following:
alerting a user so that the user can analyze the pulse echo measurements or the flexural measurements in more detail;
reprocessing the well log view image to analyze nearby positions to confirm the absence or presence of the third interface echo;
correcting a normalization performed during a calibration of the pulse echo measurements;
updating a job plan to plan an additional calibration of the pulse echo measurements; or
any combination thereof.

12. The system of claim 1, wherein the neural network comprises a convolutional neural network (CNN).

13. The system of claim 1, wherein the data processing system is configured to produce several well log views representative of measurements vs. time and depth obtained at multiple azimuths, and wherein the data processing system is configured so that processing the flexural measurements comprises:
- stacking flexural waveforms obtained at the multiple azimuths;
- identifying a background signal and a varying signal by comparing the stacked waveforms at least in two of the multiple azimuths;
- constructing a corridor region around a theoretical third interface echo among the flexural waveforms; and
- identifying the third interface echo based at least in part on a presence of the varying signal within the corridor region.

14. The system of claim 13, wherein the data processing system is configured to determine casing eccentricity and construct the corridor region based on the determined casing eccentricity.

15. A method comprising:
- receiving, into processing circuitry, flexural measurements obtained from an acoustic logging tool in a wellbore that crosses a geological formation and has a casing installed inside the wellbore;
- producing, using the processing circuitry, a well log view image using the flexural measurements that includes flexural waveforms in a plurality of positions versus time;
- processing, using the processing circuitry, the well log view image to identify a presence or absence of a third interface echo;
- in response to identifying the presence of the third interface echo, using the processing circuitry to identify an annulus between the casing and the geological formation as having a first characteristic;
- in response to identifying the absence of the third interface echo, using the processing circuitry to identify the annulus between the casing and the geological formation as having a second characteristic;
- receiving, into the processing circuitry, pulse echo measurements obtained from the acoustic logging tool;
- processing, using the processing circuitry, the pulse echo measurements to identify that the annulus between the casing and the geological formation has the first characteristic or the second characteristic;
- receiving, into the processing circuitry, pulse-echo calibration measurements obtained by the acoustic logging tool at a calibration location corresponding to a free pipe;
- receiving, into the processing circuitry, flexural measurements obtained by the acoustic logging tool at the calibration location;
- identifying, using the processing circuitry, the annulus between the casing and the geological formation in the calibration location as having the first or the second characteristic; and
- calibrating, using the processing circuitry, the pulse-echo measurements based on the first or second characteristic identification and the pulse-echo calibration measurements.

16. The method of claim 15, wherein the first characteristic of the annulus comprises a presence of a liquid or a solid in the annulus and the method comprises:
- discriminating between the presence of the solid or the liquid in the annulus using the processing circuitry based on a variation of arrival time of the third interface echo along a dimension of the borehole, the presence of the liquid is identified when the third interface echo has a continuous variation and the presence of the solid is identified when the third interface echo has a discontinuous variation.

17. The method of claim 15, wherein the second characteristic of the annulus comprises a presence of a gas in the annulus or a definition of the annulus as a dry microannulus.

18. An article of manufacture comprising one more tangible, non-transitory, machine-readable media comprising instructions that, when executed by one or more processors, cause the one or more processors to:
- receive flexural measurements obtained by an acoustic logging tool in a wellbore crossing a geological formation and having a casing installed inside the wellbore;
- produce a well log view image using the flexural measurements that includes flexural waveforms in a plurality of positions versus time;
- process the well log view image to identify a presence or absence of a third interface echo using a trained neural network to use image recognition to identify behavioral characteristics of the third interface echo among the flexural measurements;
- in response to identifying the presence of the third interface echo, identify an annulus between the casing and the geological formation as having a first characteristic; and
- in response to identifying the absence of the third interface echo, identify the annulus between the casing and the geological formation as having a second characteristic.

19. The article of manufacture of claim 18, wherein the first characteristic of the annulus comprises a presence of a liquid in the annulus and the second characteristic of the annulus comprises a dry microannulus or a presence of a gas in the annulus.

20. The article of manufacture of claim 18, comprising instructions that, when executed by the one or more processors, cause the one or more processors to:
- receive pulse echo measurements obtained by the acoustic logging tool or another acoustic logging tool in the wellbore crossing the geological formation and having the casing installed inside the wellbore; and
- process the pulse echo measurements to identify that the annulus between the casing and the geological formation has the first characteristic or the second characteristic.

21. The article of manufacture of claim 20, comprising instructions that, when executed by the one or more processors, cause the one or more processors to:
- in response to identifying that the annulus has the first characteristic using the pulse echo measurements and using the flexural measurements or identifying that the annulus has the second characteristic using the pulse echo measurements and using the flexural measurements, validate the results of the identification of the first characteristic or the second characteristic; and
- in response to identifying that the annulus has the first characteristic using the pulse echo measurements and identifying that the annulus has the second characteristic using the flexural measurements or in response to identifying that the annulus has the second characteristic using the pulse echo measurements and identifying that the annulus has the first characteristic using the flexural measurements:
- alert a user so that the user can analyze the pulse echo measurements or the flexural measurements in more detail;

reprocess the well log view to analyze nearby positions to confirm the absence or presence of the third interface echo;

correct a normalization performed during a calibration of the pulse echo measurements; or update a job plan to plan an additional calibration of the pulse echo measurements; or any combination thereof.

22. A method comprising:

receiving, into processing circuitry, flexural measurements obtained from an acoustic logging tool in a wellbore that crosses a geological formation and has a casing installed inside the wellbore;

producing, using the processing circuitry, a well log view image using the flexural measurements that includes flexural waveforms in a plurality of positions versus time;

processing, using the processing circuitry, the well log view image using a neural network that is trained to identify a presence of a third interface echo;

in response to identifying the presence of the third interface echo, using the processing circuitry to identify an annulus between the casing and the geological formation as having a first characteristic; and in response to not identifying the presence of the third interface echo, using the processing circuitry to identify the annulus between the casing and the geological formation as having a second characteristic.

23. The method of claim 22, wherein the neural network comprises a convolutional neural network (CNN).

* * * * *